(12) United States Patent
Li et al.

(10) Patent No.: US 10,061,290 B2
(45) Date of Patent: Aug. 28, 2018

(54) MOVING POSITION CONTROL SYSTEM FOR MOVING APPARATUS

(71) Applicant: SHENYANG SIASUN ROBOT & AUTOMATION CO., LTD., Liaoning (CN)

(72) Inventors: Xuewei Li, Liaoning (CN); Yiheng Liu, Liaoning (CN); Mingjie Chu, Liaoning (CN); Tinghui Chen, Liaoning (CN); Daokui Qu, Liaoning (CN); Fang Xu, Liaoning (CN)

(73) Assignee: SHENYANG SIASUN ROBOT & AUTOMATION CO., LTD, Shenyang, Liaoning (CN)

( * ) Notice: Subject to any disclaimer, the term of this patent is extended or adjusted under 35 U.S.C. 154(b) by 612 days.

(21) Appl. No.: 14/441,084

(22) PCT Filed: Nov. 7, 2013

(86) PCT No.: PCT/CN2013/086702
§ 371 (c)(1),
(2) Date: May 6, 2015

(87) PCT Pub. No.: WO2014/071857
PCT Pub. Date: May 15, 2014

(65) Prior Publication Data
US 2015/0268657 A1 Sep. 24, 2015

(30) Foreign Application Priority Data

Nov. 8, 2012 (CN) .......................... 2012 1 0443645

(51) Int. Cl.
*G06F 19/00* (2018.01)
*G05B 19/19* (2006.01)
(Continued)

(52) U.S. Cl.
CPC .......... *G05B 19/19* (2013.01); *G05B 19/258* (2013.01); *G05B 19/298* (2013.01);
(Continued)

(58) Field of Classification Search
CPC .... G05B 19/19; G05B 19/258; G05B 19/298; G05B 2219/42062; G05B 2219/36371; G05B 2219/42113
(Continued)

(56) References Cited

U.S. PATENT DOCUMENTS 4,969,109 A * 11/1990 Mizuno .................. B25J 9/1664
414/788
5,744,926 A * 4/1998 Lai ......................... G05B 11/26
318/590
(Continued)

FOREIGN PATENT DOCUMENTS

CN 1955868 A 5/2007
CN 101670981 A 3/2010
(Continued)

OTHER PUBLICATIONS

International Search Report dated Jan. 30, 2014 for PCT Appln. No. PCT/CN2013/086702.

*Primary Examiner* — Ziaul Karim
(74) *Attorney, Agent, or Firm* — Smith, Gambrell & Russell, LLP

(57) ABSTRACT

A moving position control system for a moving apparatus includes an embedded PC, a position control board, a servo driver, a servo motor, and a barcode scanner. The embedded PC sends a positioning instruction to the position control board, which processes the positioning instruction and then sends a signal to the servo driver to drive the servo motor. The barcode scanner collects absolute positions of the moving apparatus on a moving track thereof. The position
(Continued)

control board, the servo driver, and the servo motor form a closed-loop control circuit that includes a position loop control circuit, a speed loop control circuit, and a current loop control circuit. Improved operational efficiency is achieved by locating the position loop control circuit at the position control board.

12 Claims, 2 Drawing Sheets

(51) Int. Cl.
 *G05B 19/25* (2006.01)
 *G05B 19/29* (2006.01)
(52) U.S. Cl.
 CPC .............. *G05B 2219/36371* (2013.01); *G05B 2219/42062* (2013.01); *G05B 2219/42113* (2013.01)

(58) Field of Classification Search
 USPC .......................................................... 700/114
 See application file for complete search history.

(56) References Cited

U.S. PATENT DOCUMENTS

| | | | | |
|---|---|---|---|---|
| 6,004,019 A | * | 12/1999 | Suita | .................... B23K 11/252 |
| | | | | 700/2 |
| 6,194,856 B1 | * | 2/2001 | Kobayashi | ............ H02M 7/003 |
| | | | | 318/432 |
| 2006/0100723 A1 | * | 5/2006 | Sun | .................... G05B 19/4141 |
| | | | | 700/61 |

FOREIGN PATENT DOCUMENTS

| | | |
|---|---|---|
| CN | 102040072 A | 5/2011 |
| CN | 102390651 A | 3/2012 |
| EP | 0298128 A1 | 1/1989 |
| JP | 2006341271 A | 12/2006 |

* cited by examiner

MOVING POSITION CONTROL SYSTEM FOR MOVING APPARATUS

BACKGROUND OF THE INVENTION

Technical Field

The present invention relates to the automatic control field, in particular to a moving position control system for a moving apparatus.

Description of Related Art

Moving apparatus systems in the clean air environment of current wafer plants mainly employ two methods to position moving shafts.

One is a fully-closed-loop control using a barcode. A one-dimensional barcode and a servo driver are used to implement the fully-closed-loop control positioning, in which the control over the current loop, speed loop, motor position loop and absolute position loop is all done on the servo driver. Such controller for the servo driver imposes very high requirements for performance. All calculations are required to be done on the servo driver, thus affecting the speed and accuracy of the moving shaft motor. The advantage of this way is that any position on the barcode can be located.

The other is the semi-closed-loop positioning of the servo driver using a barcode label. According to this method, a servo driver and a servo motor are used to implement the semi-closed-loop control over positions, and after the conveying vehicle in the clean air environment is located at a positioning point on a track, a barcode scanner scans the one-dimensional barcode value to implement auxiliary positioning. This positioning manner has the following disadvantages: the moving apparatus cannot stop and locate at points with the one-dimensional barcode label; the moving apparatus cannot stop at places without the one-dimensional barcode label; once the moving apparatus has faults and stops at points with the label, the on-site scheduling system cannot know the position of the moving apparatus and let other moving apparatus to change routes, thus causing traffic jam to the sky track. Besides, if this positioning manner is employed, each of the positioning points of stations in the pre-designed layout must be pasted with a one-dimensional label to make a mark, and adding stations is very difficult and needs to add a one-dimensional barcode label at corresponding position of the sky track, causing trouble to the on-site construction in the clean air environment.

BRIEF SUMMARY OF THE INVENTION

To solve the above problems, the present invention provides a moving position control system for a moving apparatus, comprising an embedded PC, a position control board, a servo driver, a serve motor and a barcode scanner, wherein the embedded PC is used to send a positioning instruction;

the position control board is used to receive the positioning instruction sent by the embedded PC, and process and send the positioning instruction;

the servo driver is used to receive a signal from the position control board to drive the serve motor;

the barcode scanner is used to collect the absolute positions of the moving apparatus on a moving track thereof;

the embedded PC is connected with the position control board; the position control board is respectively connected with the servo driver, the servo motor and the barcode scanner; the servo driver is respectively connected with the position control board and the servo motor; the servo motor is respectively connected with the servo driver and the position control board; the barcode scanner is connected with the position control board;

the position control board, the servo driver and the servo motor form a closed-loop control circuit; the closed-loop control circuit comprises a position loop control circuit, a speed loop control circuit and a current loop control circuit, wherein the position loop control circuit is located at the position control board.

Preferably, the speed loop control circuit and the current loop control circuit are located at the servo driver.

Preferably, the position control board and the embedded PC communicate with each other through a CAN bus.

Preferably, the position control board and the barcode scanner communicate with each other through a CAN-open protocol.

Preferably, through expanding and developing the CAN-open main station function of an address bus of a position control board controller, the position control board controller has two paths for CAN communication.

Preferably, the position control board controller reads a code disk value of a servo motor fed back by the servo driver through the self-owned encoder interface, and the position control board controller reads the absolute position of the barcode through CAN-OPEN to perform dual position closed-loop control.

Preferably, the position control board uses DSP 2812 as the controller.

Preferably, the program scanning period of the position control board controller is less than or equal to one millisecond.

Preferably, the barcode scanner is a one-dimensional barcode scanner supporting CAN-open protocol.

Preferably, the moving apparatus is a sky moving apparatus of a wafer plant or a stocker of an automatic logistic warehousing system.

The present invention has the beneficial effects in that: the position loop control circuit of the servo driver is placed in the position control board, improving the response speed of the servo driver; the absolute position read by the barcode scanner is placed in the position control board to take part in the fully-closed-loop control, achieving an accurate position control effect; and the absolute position location is implemented through the barcode band, realizing location at any point of the track where the moving apparatus runs. The control system uses the barcode band to implement the fully-closed-loop position control, effectively reducing size on the basis of improving the computation speed, and solving the problems of slow fully-closed-loop location and inconvenient semi-closed-loop location of the two location modes in the prior art.

EXPLANATION OF MARKS IN THE FIGURES

1. EPC
2. Position control board
3. Servo driver

4. Servo motor
5. Barcode scanner

DETAILED DESCRIPTION OF THE INVENTION

To make the objectives, technical solution and advantages of the present invention clearer; the present invention is described in further details with reference to the following attached drawings and embodiments. It should be understood that the embodiments depicted here are only illustrative, and do not limit the present invention.

In this embodiment of the present invention, a moving position control system for a moving apparatus in the clean air is designed on the basis of the mechanical structures and functions of the clean sky moving apparatus and the track on which the vehicle runs (hereinafter referred to as a sky track) in the current wafer plant. For the moving position control system for the moving apparatus in the present invention, the moving apparatus in this embodiment is a clean sky moving apparatus (hereinafter referred to as a sky vehicle). The following are description with reference to the attached drawings.

Figure 1:
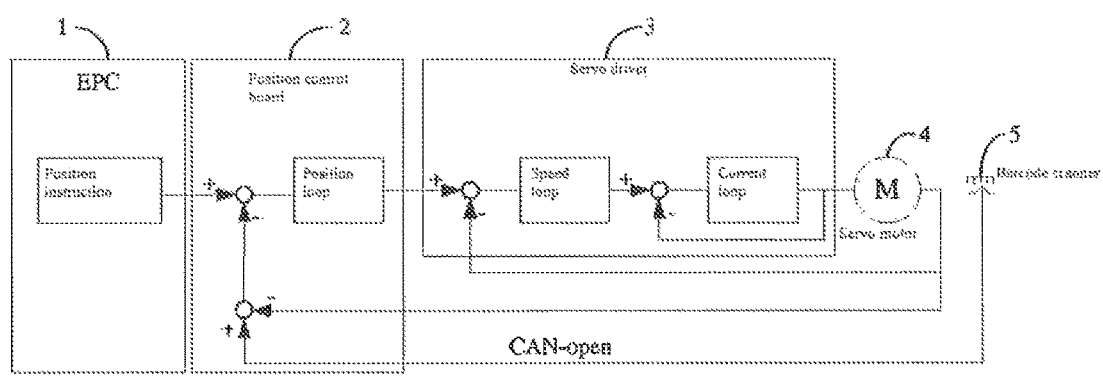
FIG. 1 is a structure diagram of the moving position control system for a clean sky moving apparatus provided in one embodiment of the present invention.

As shown in FIG. 1, the moving position control system for the clean sky moving apparatus in this embodiment comprises an EPC (namely embedded PC) 1, a position control board 2, a servo driver 3, a servo motor 4 and a barcode scanner 5, wherein the EPC1 is used to send the positioning instruction; the position control board 2 is used to receive the positioning instruction sent by the EPC1, and process and send the positioning instruction; the servo driver 3 is used to receive the signal from the position control board 2 to drive the servo motor 4; the signal comprises but is not limited to the positioning instruction; the barcode scanner 5 is used to collect the absolute position of the sky vehicle on the sky track. The EPC1 is connected with the position control board 2; the position control board 2 is respectively connected with the servo driver 3, the servo motor 4 and the barcode scanner 5; the servo driver 3 is respectively connected with the position control board 2 and the servo motor 4; the servo motor 4 is respectively connected with the servo driver 3 and the position control board 2; the barcode scanner 5 is connected with the position control board 2. The position control board 2, the servo driver 3 and the servo motor 4 form a closed-loop control circuit; the closed-loop control circuit comprises a position loop control circuit, a speed loop control circuit and a current loop control circuit, wherein the position loop control circuit is located at the position control board 2, while the speed loop control circuit and the current loop control circuit are located at the servo driver 3.

Figure 2:
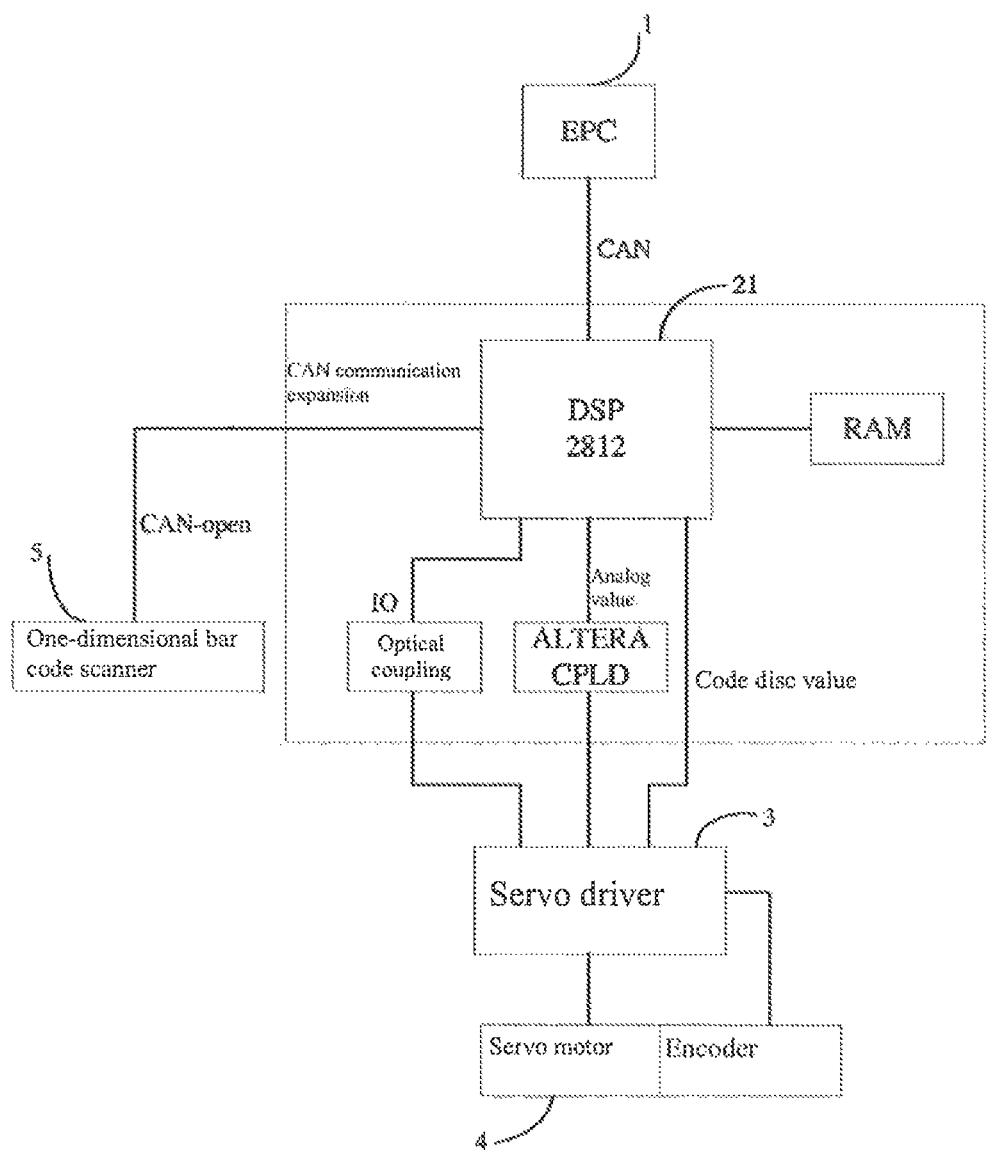
FIG. 2 is an application diagram of the moving position control system for a clean sky moving apparatus provided in one embodiment of the present invention in a sky vehicle system.

As shown in FIG. 1 and FIG. 2, the position control board 2 and the EPC1 communicate with each other through the CAN bus; the position control board 2 communicates with the barcode scanner 5 through the CAN-open protocol, collecting the absolute position of the sky vehicle on the sky track. In this embodiment, the barcode scanner 5 usually uses a one-dimensional car code scanner, for example the SICK one-dimensional barcode scanner. The controller 2 on the position control board 2 is responsible for receiving the positioning instruction sent by the EPC1, processing the order and then sending the order to the servo driver 3. In this embodiment, the controller on the position control board 2 is a DSP 2812. To ensure that the servo driver 3 response to the positioning instruction is quick enough, the position loop of the servo motor 4 is placed on the position control board 2 when the servo driver 3 runs in the speed mode. In this way, the servo driver 3 is only responsible for processing the control over the speed loop and the current loop, greatly reducing the task quantity of the servo driver 3 to control the position loop, the speed loop and the current loop in the prior art. To solve the problem of inaccurate absolute position caused by a slip of the sky vehicle on the sky track, in this embodiment, the one-dimensional barcode scanner which supports the CAN-open protocol communication is used to scan and locate the one-dimensional barcode on the sky track. Through expanding and developing the CAN-open main station function of the address bus of DSP 2812, the DSP 2812 has two paths for communication, and the program scanning period is controlled within 1 millisecond, and in this embodiment, the program scanning period is 1 millisecond, capable of meeting the location requirements. DSP 2812 reads a code disk value of the servo motor 4 fed back by the servo driver 3 through the self-owned encoder interface, and DSP 2812 reads the absolute position of the barcode through CAN-open to perform dual position closed-loop control.

In this embodiment of the present invention, the position loop control circuit of the servo driver 3 is placed in the position control board 2, improving the response speed of the servo driver 3; the absolute position read by the barcode scanner 5 is placed in the position control board 2 to take part in the fully-closed-loop control, achieving an accurate position control effect; the absolute position location is implemented through the barcode band, realizing location at any point of the sky track; and the positioning points of the sky vehicle can be conveniently modified through adding machines or adjusting the machine positions in the wafer plant. The control system uses the barcode band to implement the fully-closed-loop position control, effectively reducing size on the basis of improving the computation speed, and solving the problems of slow fully-closed-loop location and inconvenient semi-closed-loop location of the two location modes in the prior art.

The present invention can be used for the sky moving apparatus of wafer plants and can also be used to locate the moving shaft of the stocker of the automatic logistic warehousing system. The application varies with industries, and a large-power servo driver or a small-power servo driver can be correspondingly selected according to the load size.

The above embodiments are only preferably embodiments of the present invention and shall not be regarded as limit of the present invention. Any modifications, equivalent changes and improvement made within the spirit and principle of the present invention shall fall within the protective scope of the present invention.

What is claimed is:

1. A moving position control system for a moving apparatus, comprising:
    an embedded PC, a position control board, a servo driver, a servo motor, and a barcode scanner, wherein
    the embedded PC is operable to send a positioning instruction,
    the position control board is operable to receive the positioning instruction sent by the embedded PC, process the received positioning instruction, and send a signal based on the processed positioning instruction,
    the servo drive is operable to receive the signal from the position control board to drive the servo motor,
    the barcode scanner is operable to collect absolute positions of the moving apparatus on a moving track along which the moving apparatus travels,
    the embedded PC is connected with the position control board; the position control board is respectively connected with the servo driver, the servo motor and the barcode scanner; the servo driver is respectively connected with the position control board and the servo motor; the servo motor is respectively connected with the servo driver and the position control board; and the barcode scanner is connected with the position control board, the position control board, the servo driver and the servo motor form a closed-loop control circuit; the closed-loop control circuit comprises a position loop control circuit, a speed loop control circuit and a current loop control circuit, with the position loop control circuit, the speed loop control circuit and the current loop control circuit positioned within the system so as to distribute processing controls of the closed-loop control circuit between at least the position control board and the servo driver, and the position loop control circuit is located at the position control board.

2. The moving position control system for a moving apparatus according to claim 1, wherein, the speed loop control circuit and the current loop control circuit are located at the servo driver.

3. The moving position control system for a moving apparatus according to claim 1, wherein, the position control board and the embedded PC are communicable with each other through a CAN bus.

4. The moving position control system for a moving apparatus according to claim 1, wherein, the position control board and the barcode scanner are communicable with each other through a CAN-open protocol.

5. The moving position control system for a moving apparatus according to claim 1, wherein, the position control board comprises a position control board controller, the position control board controller having two paths for CAN communication including at least one CAN communication path that is based on a CAN-open main station function of an address bus.

6. The moving position control system for a moving apparatus according to claim 5, wherein, the position control board controller is operable to read a code disk value of a servo motor fed back by the servo driver through a self-owned encoder interface, and the position control board controller is operable to read an absolute position of a barcode through CAN-open, protocol to perform a dual position closed-loop control.

7. The moving position control system for a moving apparatus according to claim 6, wherein, the position control board uses a DSP 2812 as the controller.

8. The moving position control system for a moving apparatus according to claim 6, wherein, a program scanning period of the position control board controller is less than or equal to one millisecond.

9. The moving position control system for a moving apparatus according to claim 5, wherein, the position control board uses a DSP 2812 as the controller.

10. The moving position control system for a moving apparatus according to claim 5, wherein, a program scanning period of the position control board controller is less than or equal to one millisecond.

11. The moving position control system for a moving apparatus according to claim 1, wherein, the barcode scanner is a one-dimensional barcode scanner supporting CAN-open protocol.

12. The moving position control system for a moving apparatus according to claim 1, wherein, the moving apparatus is a sky moving apparatus of a wafer plant or a stocker of an automatic logistic warehousing system.

* * * * *